May 12, 1959  J. ROSAN  2,886,090
TOP LOCKING INSERT
Filed June 29, 1956  2 Sheets-Sheet 1

Joseph Rosán,
INVENTOR.

BY C. Lauren Maloby
ATTORNEY

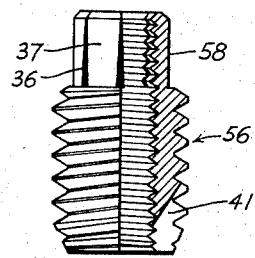
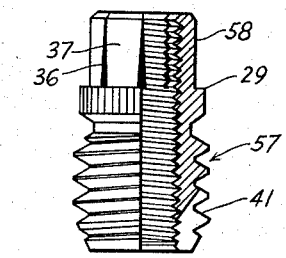
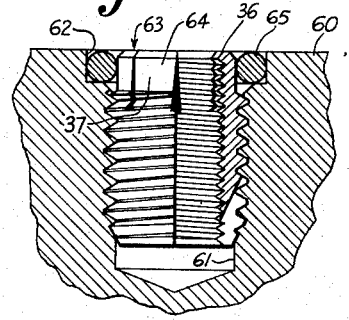
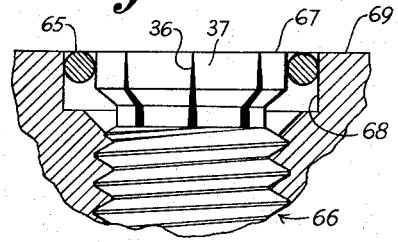
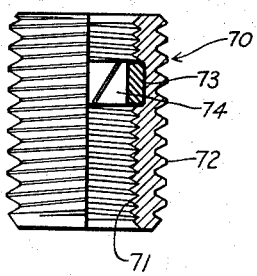
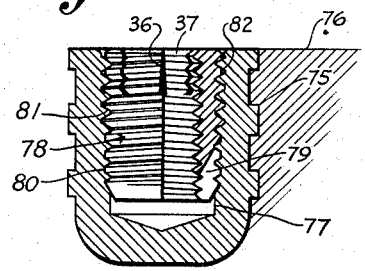

United States Patent Office 2,886,090
Patented May 12, 1959

2,886,090

TOP LOCKING INSERT

Joseph Rosan, Newport Beach, Calif.

Application June 29, 1956, Serial No. 594,755

7 Claims. (Cl. 151—41.73)

This invention relates generally to inserts designed for anchorage in bores of bodies of relatively soft materials for such typical purposes as making various connections with such bodies as, for instance, providing a screw mounting for a screw threaded stud in such a body.

The present invention is more particularly concerned however with the problem of securing the mechanical connector or fastener such as a stud in the insert in such manner as to preclude loosening of the stud due to the vibration or to analogous causes.

A particular object of the invention is to provide a stud-locking insert which, although embodying the advantages set forth above, will nevertheless be simple in nature and easy to install and use yet economical to fabricate.

Other objects and advantages of the invention will appear and be brought out more fully in the following specification, reference being had to the accompanying drawings.

In the drawings:

Figure 7 is a view similar to Figure 6 showing the self locking features incorporated in an insert having the upper end formed as a locating sleeve.

Figure 8 is a view of another modification combining the features of the inserts of Figures 1 and 7.

Figure 9 is a view of the insert of Figure 6 modified to have an auxilary lock ring feature added.

Figure 10 is a view of a further modification of the insert of Figure 9.

Figure 11 is a view of another modified form of the invention having a modified thread locking feature for the contained stud.

Figure 12 is a view of the insert of Figure 6 together with a molded-in cap or shell.

Figure 1:
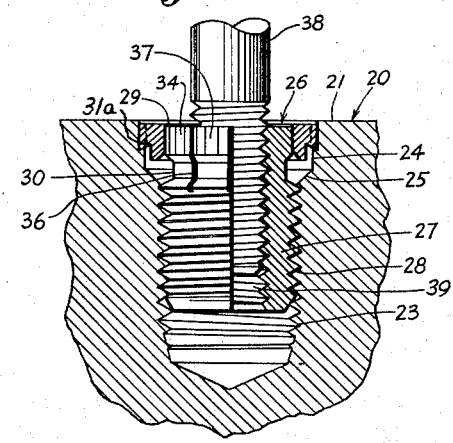
Figure 1 is an elevation view in quarter section of an insert embodying one form of the invention shown installed in a body of relatively soft material.

With reference first to the illustrative form of the invention disclosed in Figures 1 through 4, numeral 20 designates generally a body of relatively soft material, such as aluminum or magnesium alloy, plastic, or the like, here shown in the form of a blind boss having an outer surface 21. When I speak of a body of relatively soft material, it will of course be understood that I refer to a body which is of a material softer than that of the insert. The insert, as will presently appear, consists of a body and locking ring, both of which are constructed of some suitable relatively hard material such as mild or heat treated steel, brass, bronze, etc. In the instant form of the invention, the body or boss 20 is formed with a blind screwthreaded socket or bore 23, extending inwardly from its outer surface 21, and with an enlarged counterbore 24 extending inwardly from surface 21 to a predetermined depth, said counterbore 24 having a vertical side wall affording an outwardly facing annular shoulder 25 at its juncture with bore 23.

The insert body, in this instance of generally tubular form, is designated generally by numeral 26, and is provided with an inner portion or section 27 having external screwthreads 28 adapted for engagement with screwthreaded bore 23, and with an outer portion or head 29, of a diameter preferably, though not necessarily, of approximately the same outside diameter as the diameter of inner threaded section 27. In the preferred embodiment of the invention here illustrated, head 29 and threaded section 27 are joined by a short unthreaded neck or thread-relief portion 30. The aforementioned counterbore 24 is drilled to a depth approximately equal to the length of insert head 29, or preferably, and as here illustrated, to a depth slightly greater than the length of head 29.

Figure 4:
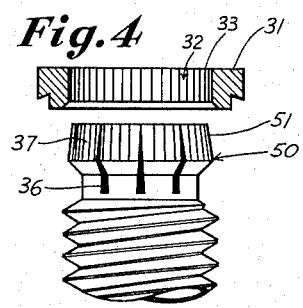
Figure 4 is a view similar to Figure 3 showing a modified locking feature using the lock ring of Figure 1.

Head 29 is formed with axially extending external locking formations adapted to inter-engage by relative longitudinal movement with complemental locking formations formed inside a lock ring 31 (Figure 4). This locking ring has a central bore 32 formed with locking formations adapted to inter-engage or mesh by relative longitudinal sliding movement with the external locking formations on head 29. These locking formations are a plurality of parallel serrations or ribs 33 disposed parallel to the longitudinal axis of the ring and are of a size and shape similar to complemental serrations 34 on head 29. The locking ring 31 has axial external serrations 31ᵃ. The upper end of body 26 is split at 36 thus forming a plurality of resilient fingers or fingers 37, which are bent radially inwardly in the formation of the insert. Insert 26 has a threaded bore 39 for receiving a screw or stud 38 which has external threads 39 corresponding to threads 37 of the insert.

The procedure for installing the insert Figure 1 is as follows:

The insert body is first screwed into the tapped bore 23 in body 20 until its head is substantially flush with the outer surface 21 of the body. Screw or stud 38 is then run in threaded bore 39 of the insert and a first locking action will result from the pressure of resilient fingers 37 against the screw or stud. Locking ring 31 is then engaged with the head 29 of the insert and then forced into the counterbore 24, the internal serrations of the locking ring meshing with serrations 34 of the insert to contract the tongues 37, and the external serrations 31ᵃ of said locking ring cutting into the vertical side wall of said counterbore. Thus, the screw or stud 38 is securely locked and held in the insert and the insert is held against rotation by the locking ring 31.

Figure 2:
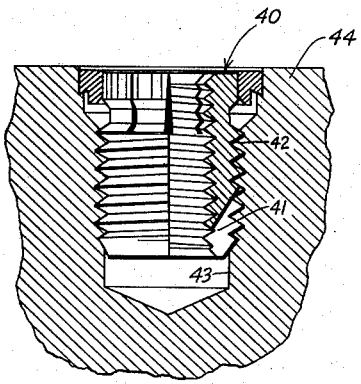
Figure 2 is a view similar to Figure 1 showing a modified form of insert having self tapping features.

In Figure 2 is shown a modified form of the invention. This figure shows an insert 40 generally similar to insert 26, however modified by having self tapping inner end formations 41 adapted to tap threads 42 in a smooth bore 43 in a body 44 of relatively soft material similar to body 21. After this insert is installed in the body 44 a screw or stud 38 may be inserted and secured therein in the manner of the insert Figure 1.

Figure 3:
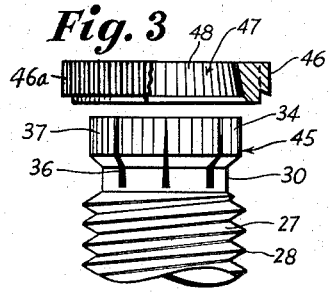
Figure 3 is a view partly broken away of the insert of Figure 1 showing a modified form of lock ring.

Referring now to Figure 3, I show a modified form of the invention wherein an insert 45 has a serrated head 34 and split upper end for co-engagement with a locking ring 46 similar to the locking ring 31 which has a tapered opening 47, internal serrations 48 for meshing with serrations 34, and external serrations 46ᵃ for cutting into the side wall of the counterbore. In this form of invention, the application of lock ring 46 to head portion 34 will cause contraction of the resilient tongues 37 and lock the contained screw or stud therein in the manner of Figures 1 and 2.

In Figure 4 I show a further modified form of the invention wherein an insert 50 has a tapered serrated upper end portion 51 for co-engagement with a lock ring 31 which has a straight bore opening and serrations. The operation of this form of the invention is similar to that of Figure 3 whereby engagement of lock ring 31 on serrated portion 51 will close in or contractingly engage the fingers 37 which will lock the contained screw or stud.

Figure 5:
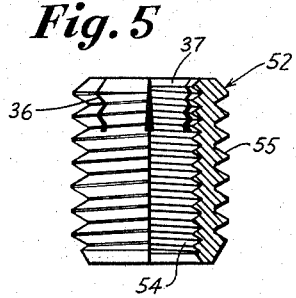
Figure 5 is a view similar to Figure 1 of another modified form of the invention.
Figure 6:
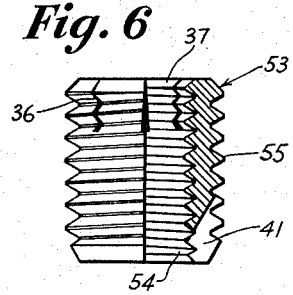
Figure 6 is a view showing the insert of Figure 5 modified by having self tapping features.

In Figures 5 and 6 I show further modified forms of the invention wherein inserts 52 and 53, respectively, are tubular and have internal threads 54 and external threads 55. These inserts are split at 36 and have resilient fingers 37. Insert 53 has self tapping inner end formations 41. The screw or stud locking features of these forms of the invention are provided solely by the radially inwardly bent fingers 37, the internal threads of which will effect an interference fit with the screw or stud.

In Figures 7 and 8 are shown further modified forms of the invention. In these figures inserts 56 and 57 are, respectively, generally similar to inserts 55 and 40, however have upper extensions 58 forming centering pins or posts. These extensions are split at 36 and have inwardly bent resilient fingers 37 as with the other previously described forms of invention, and the locking action on the contained screw or stud is similar.

In Figure 9 is shown a further modified form of the invention. In this figure a parent body of relatively soft material 60 has a bore 61 and a counterbore 62, 61 being tapped by a self tapping insert 63 generally similar to insert 56. This insert has an upper end 64 of reduced diameter and is split at 36 providing tongues 37. An auxiliary locking device 65, comprising either a split or continuous ring of steel or other material having a desired degree of compressibility or incompressibility, is placed in the annular channel formed by the counterbore 62 and the extension 64 of the insert. This lock ring 65 serves to prevent expansion of fingers 37 after they have made locking engagement with a contained screw or stud.

In Figure 10 I show a variation of the form shown in Figure 9. In this figure an insert 66 has an enlarged head 67 which is received in a counterbore 68 in a parent body 69, and a lock ring 65 placed in said counterbore secures and holds the fingers 37 in the same manner as in Figure 9.

In Figure 11 I show another form of the invention. In this figure an insert 70 generally similar to insert 52 of Figure 5 has an internal threaded bore 71 and external threads 72. Bore 71 has an annular recess 73 near the upper end thereof and, positioned in this recess, is a ring of soft metal, plastic, fiber or the like which will engage the external threads of a screw or stud and lock the same in the insert.

In Figure 12 I show a further modified form of the invention. In this figure a cap 75 is molded in a parent body of material 76 and has a straight bore 77. An insert 78 has self tapping formations 79 for tapping threads in bore 77. This insert is split at 36 at its upper end, forming resilient tongues 37 for making locking engagement with a screw or stud. The insert further has truncated thread 80 at its lower end for tapping undersized threads in the cap 75 such that the following full formed threads 81 of the insert will make an interference and locking fit with the undersized threads of the cap. The threads of the insert 82 at the upper end may also be truncated to provide clearance for expansion of fingers 37 when a screw or stud is run in the insert.

I claim:

1. A locking insert structure adapted for installation in a threaded socket having a counterbore at its outer end, said insert comprising: a tubular element internally threaded throughout its length, said element being split and free of external threads at its outer end portion to form a plurality of resilient tongues that can be urged inwardly to effect locking engagement with a contained threaded member, said insert being externally threaded at its inner end and adapted to be threaded into said socket until its resilient tongues are disposed in the plane of said counterbore; and a locking ring having an internal surface adapted to slidably and contractingly engage with the outer surface of said tongues and be placed in said counterbore to urge said tongues inwardly into locking engagement with said threaded member, the outer surface of said locking ring frictionally engaging the inner surface of said counterbore to lock said element against rotation in said socket.

2. An insert structure, as defined in claim 1, in which the resilient tongues extend slightly inwardly prior to engagement by said locking ring.

3. An insert structure, as defined in claim 1, in which the locking ring is circular in radial cross-section.

4. An insert structure, as defined in claim 1, in which the tongues are provided with axially extended external serrations and the locking ring is provided with complementary internal serrations.

5. An insert structure, as defined in claim 4, in which the locking ring has external axially extending serrations for broaching locking grooves in the counterbore.

6. An insert structure, as defined in claim 4, in which the tongues are externally tapered.

7. An insert structure, as defined in claim 4, in which the locking ring is internally tapered.

References Cited in the file of this patent

UNITED STATES PATENTS

| | | |
|---|---|---|
| 985,826 | McLaughlin | Mar. 7, 1911 |
| 1,820,965 | D'Halloy | Sept. 1, 1931 |
| 2,191,201 | Kass | Feb. 20, 1940 |
| 2,400,318 | Rosan | May 14, 1946 |
| 2,455,885 | Theurer | Dec. 7, 1948 |
| 2,492,536 | Rosan | Dec. 27, 1949 |
| 2,544,304 | Eckenbeck et al. | Mar. 6, 1951 |